United States Patent Office 3,597,394
Patented Aug. 3, 1971

3,597,394
BRANCHING OR CROSSLINKING OF POLYCARBONATES
Herbert L. Rawlings, New Martinsville, W. Va., assignor to Mobay Chemical Company, Pittsburgh, Pa.
No Drawing. Filed Oct. 16, 1969, Ser. No. 867,065
Int. Cl. C08g 17/13
U.S. Cl. 260—47XA                    5 Claims

ABSTRACT OF THE DISCLOSURE

Polycarbonates are branched or crosslinked by the addition of the cyclic trimer of phosphonitrilic chloride.

---

Although polycarbonates in general are heat resistant materials, the high processing temperatures required for extrusion, injection molding and the like cause some loss of molecular weight due to thermal degradation. Such loss is usually accompanied by a decrease in melt viscosity. In some forms of thermoplastics processing, e.g., blow-molding or thermoforming, where the plastic must be manipulated at or near its molten state for a relatively long time period, such a loss of viscosity is a distinct disadvantage. This disadvantage has been overcome in some cases by inducing a network structure in polycarbonate by employing trifunctional hydroxy compounds as coreactants in the preparation of the polymer. It would be more advantageous, however, if a network structure could be induced in a linear polycarbonate via a crosslinking additive at the time of its processing rather than at the time of its synthesis, especially for those who lack synthesis facilities. Another advantage of inducing crosslinking or branching by introducing additives to already prepared linear polycarbonates is that the modified composition is soluble in common polycarbonate solvents at low temperatures, making possible the production of coatings or solution spun fibers that can be transformed into insoluble, crosslinked materials by a subsequent heat cure. It has been found that merely adding trifunctional hydroxy monomers to the finished resin does not yield such a result.

It is therefore an object of this invention to provide crosslinked polycarbonates and a process for preparing them which are devoid of the foregoing disadvantages.

Another object of this invention is to provide a process for inducing a network structure into a polycarbonate which has already been synthesized.

A further object of this invention is to provide crosslinkable polycarbonates which are soluble in common polycarbonate solvents at low temperatures.

Yet another object of this invention is to provide crosslinkable polycarbonates suitable for the preparation of coatings or solution spun fibers that can be transformed into insoluble, crosslinked materials by a subsequent heat cure.

The foregoing objects and others which will become apparent from the following description are accomplished in accordance with this invention, generally speaking, by providing a crosslinked polycarbonate and a method for preparing it in which an effective amount of a polyfunctional acid halide to induce branching or crosslinking is added to an already prepared polycarbonate and intimately admixed therewith. The admixture is then heated until the crosslinked or branched polycarbonate is obtained. In order to be suitable as the polyfunctional acid halide, the the crosslinking or branching additive must have suitable thermal stability and hydrolysis resistance to withstand exposure to polycarbonate melt processing conditions. The most suitable of all such polyfunctional acid halides is the cyclic trimer of phosphonitrilic chloride $(PNCl_2)_3$.

It is not understood how the additive of this invention induces crosslinking and branching in an already prepared polycarbonate to produce a network structure while other agents which are known to induce branching when used as reactants in the preparation of polycarbonates do not produce such a network structure when used as a polycarbonate additive. It is believed, however, that the acid halide acts to reunite OH terminated fragments created by the scission of oxidized polycarbonate. The polyfunctional phenol additives, on the other hand, appear to be primarily degradative because of a dominant attack on the carbonate linkage overshadowing the possibility of branching or crosslinking through reaction with any residual —COCl groups. While the foregoing theory is merely a hypothesis and may in fact not represent the mechanics by which the results of the instant invention are achieved, it is none the less true that an already synthesized polycarbonate polymeric material can be crosslinked using the cyclic trimer of phosphonitrilic chloride as an additive to the already prepared polymer and then heating the admixture while branching or crosslinking agents commonly used as reactants in the preparation of the polycarbonate per se such as trihydroxy monomers are not thus operable. Hence, those who lack synthesis facilities can induce a network structure into a substantially linear polycarbonate at the time it is being processed through the addition of the crosslinking additive of this invention. Further, modified compositions which are soluble in common polycarbonate solvents at low temperatures can thus be prepared so that coatings or solution spun fibers that can be transformed into insoluble, crosslinked materials by a subsequent heat curing step can be produced.

The crosslinking additive of this invention may be used in any effective amount to induce the degree of branching or crosslinking desired; that is, an increase in the quantity of the additive of this invention will, upon the application of heat, induce higher and higher degrees of crosslinking and therefore impart a denser network structure to the polymer. As a consequence, the amount of the crosslinking additive to be employed is dictated only by the degree of crosslinking or branching desired. As a general rule, however, quantities of from about 0.25 to about 3.5 percent by weight based on the weight of the polycarbonate are used, although greater or lesser quantities can be employed with equal facility depending on the result desired.

The temperature to which the polycarbonate containing the additive of this invention is heated in order to induce crosslinking or branching should be at least about 180° C.; generally, however, the processing conditions under which the polycarbonate is worked up involve sufficiently elevated temperatures to initiate the crosslinking activity of the additive of this invention. It is to be understood, however, that any temperature sufficient to at least initiate the action of the additive of this invention may be employed, the upper limits of which are proscribed only by the facilities available for handling the polymer, the thermal stability of the polycarbonate or some other ancillary consideration. Temperatures as high as 400° C. or more may even be used since the additive of this invention is sufficiently stable to heat to withstand the temperatures to which the polycarbonate itself will be subjected.

The trimer of this invention may be mixed with the polycarbonate to be crosslinked by any suitable means. A convenient method for adding the trimer is to spray or blend a solution thereof onto granules of the polymer by tumbling followed by extrusion or some other suitable homogenizing step to incorporate the trimer intimately into the polymer composition. Further, the crosslinking additive of this invention may be thoroughly distributed in a polycarbonate by simply mixing the materials together by any of the variety of methods normally employed for the incorporation of plasticizers or fillers into thermoplastic polymers including, but not limited to mixing rolls, dough mixers, Banbury mixers, extruders and other mixing equipment.

Any suitable polycarbonate and particularly linear polycarbonates may be crosslinked in accordance with this invention. For example, the carbonate polymers may be prepared by reacting a dihydric phenol with carbonate precursors such as phosgene, a haloformate or a carbonate ester. Some suitable reactants and processes for the preparation of polycarbonates are set forth, for example, in Canadian Pats. 578,585; 578,795; and 594,805; and U.S. Pats. 3,028,365; 2,970,131; 3,248,414; 2,991,273; 2,999,-835; 3,148,172; 3,320,211; 3,280,078; 3,094,508; 3,277,-055; 3,261,808; 3,251,803; 3,014,891 and the like, as well as in Chemistry and Physics of Polycarbonates by Hermann Schnell and Polycarbonates by William F. Christopher and Daniel W. Fox.

Generally, all polycarbonate plastics regardless of the compounds from which they are formed or the process used in forming them, can be crosslinked in accordance with this invention, whether they are linear or already branched. As indicated hereinbefore, the polycarbonate plastic can be produced from a dihydroxy diarylalkane and phosgene or a diester of carbonic acid such as, for example, by the process disclosed by Schnell et al. in Canadian Pat. 578,585. Another suitable method for preparing the polycarbonate plastic is described in U.S. Pat. 3,271,367 which discusses dihydroxydiarylsulphones. Other polycarbonates which can be crosslinked in accordance with this invention are disclosed in U.S. Pats. 2,999,-846 and 3,062,781. Since the foregoing Canadian and United States patents are incorporated herein by reference, a detailed description of methods for making polycarbonates need not be set forth herein. Suffice it to say that these and all polycarbonates may be treated according to the process of this invention, particularly those which are of the greatest commercial importance and which have weight average molecular weights of at least about 5,000.

The crosslinked polycarbonates of this invention may be used in preparing molding formulations either alone or in combination with fillers such as woodflour, diatomaceous earth, silica, carbon black and so on to make molded forms of various shapes. They are also useful in preparing gaskets, tubing and other materials which are solvent and heat resistant. Films of the materials prepared in conventional ways are useful as wrapping or packaging materials, containers, covers, closures, tapes of various types such as insulating tapes and pipe coverings and so on. Films and fibers of the material can be beneficially oriented or stretched at elevated temperatures. The fibrous form of the material can advantageously be used for yarn, thread, bristles, rope and so on. The present materials can be used as surface covers for appliances and the like or as coatings for rods and wire as dynamoelectric machine slot insulation and as a bonding material for parts or laminates and an adhesive formulation. They are efficacious in wire enamels, varnishes and paints and can be readily mixed with pigments, stabilizers, plasticizers and so on. The present materials can also be alloyed with other compositions.

The invention is further illustrated but is not intended to be limited by the following examples in which all parts and percentages are by weight unless otherwise specified.

EXAMPLES 1–3

Preparation of the polycarbonate

About 454 parts of 4,4'-dihydroxydiphenyl-2,2-propane and about 9.5 parts of p-tertiary-butylphenol are suspended in about 1.5 liters of water. In a three-neck flask equipped with agitation and a gas addition tube, oxygen is removed from the mixture by blowing nitrogen through it while agitating for about 15 minutes. Then about 355 parts of 45 percent sodium hydroxide and about 1,000 parts of methylene chloride are added. The mixture is cooled to about 25° C. While maintaining this temperature by cooling, about 237 parts of phosgene are added uniformly over about a 120 minute period. An additional about 75 parts each of a 45 percent sodium hydroxide solution are added after about 15 to 30 minutes respectively after the phosgene addition has begun. To the resulting solution, about 1.6 parts of triethylamine are added and the mixture is agitated for an additional 15 minutes. A highly viscous solution is formed, the viscosity of which is adjusted by the addition of methylene chloride and the aqueous phase is separated. The organic phase is washed with water until free of salt and alkali. The polycarbonate is recovered from the washed solution and dried.

The cyclic trimer of phosphonitrilic chloride is mixed with the polycarbonate pellets thus obtained by tumbling the amount of the additive indicated in the following table with the pellets in a stainless steel container in a Mod 730 D U.S. Stoneware drum tumbler. The mixture is homogenized by melting and extruding it through a 1½ inch single screw extruder following which the extrudate is cooled and chopped into pellets. The pellets are dried at 0.5 torr, 150° C. for 30 minutes and thereafter heated to a melt at 300° C. at which temperature the melt is held for varying time periods as indicated in the following table. At the end of the 300° C. conditioning period, the melt is cooled and evaluated to determine its relative viscosity (R.V.). A decrease of R.V. indicates a loss of molecular weight while an increase indicates an increase in the molecular weight through the formation of a network or crosslinked structure.

TABLE I

| Example | Additive | Concn., p.p.h. | R.V. at 300° C. after — | | | | | |
|---|---|---|---|---|---|---|---|---|
| | | | 0 hr. | 2 hrs. | 3½ hrs. | 4 hrs. | 18 hrs. | 24 hrs. |
| 1 | $(PNCl_2)_3$ | 0.5 | 1.307 | 1.312 | 1.321 | | 1.306 | |
| 2 | $(PNCl_2)_3$ | 1.0 | 1.305 | | 1.324 | | 1.403 | |
| 3 | $(PNCl_2)_3$ | 1.5 | 1.309 | | | | | Insol. gel.[1] |

[1] Swells in methylene chloride.

The data from these examples shows that the addition of minor amounts of phosphonitrilic chloride trimer induced noticeable crosslinking or branching in the polycarbonate within about two hours at a melt temperature of 300° C. and that the amount of network formation increased with increasing concentrations of $(PNCl_2)_3$.

EXAMPLES 4–6

The polycarbonate described in Example 1 is processed as described therein and tested for an increase or decrease in relative viscosity according to the procedure of Example 1 except that some known branching agents for polycarbonates are used as a crosslinking additive instead of the cyclic trimer of phosphonitrilic chloride. The data for these experiments is recorded in the following table:

TABLE II

| Example | Additive | Concn., p.p.h. | R.V. at 300° C. after— | | | | | |
|---|---|---|---|---|---|---|---|---|
| | | | 0 hr. | 2 hrs. | 3½ hrs. | 4 hrs. | 18 hrs. | 24 hrs. |
| 4 | Phloroglucinol | 0.4 | 1.309 | 1.232 | | 1.211 | 1.220 | |
| 5 | Triscresol [1] | 1.0 | 1.306 | 1.253 | | 1.248 | 1.243 | |
| 6 | None | | 1.314 | | | | | 1.318 |

[1] See the following formula:

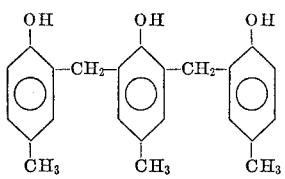

A unique effect of this invention is illustrated by the foregoing examples in which some agents which are known to yield crosslinked polycarbonates when employed as comonomers in the preparation of the polymer per se did not produce a crosslinking or branching in the polymer when incorporated therein as an additive. Such results clearly demonstrate that the instant concept is not predicated on the mere order of addition of reactants.

EXAMPLE 7

The two samples of the polycarbonate prepared as described in Example 1 are tested for a determination of the melt viscosity vs. shear rate at 300° C. The first sample contained 1 part per hunderd (p.p.h.) parts of $(PNCl_2)_3$ while the second sample contained no additive. Each polycarbonate sample is extruded through an orifice by a ram driven at several different lineal speeds to give shear rate variation. The measurement of the corresponding shear stress permits the derivation of the viscosity parameter. The resulting data indicates that the viscosity of the resin composition containing the additive of this invention at low shear rates is significantly higher than the viscosity of the same resin without the additive and remains higher although at a decreasing increment as the shear rate increases. Such results indicate that crosslinking bonds are indeed formed by the incorporation of the trimer of this invention.

While other additives have been disclosed heretofore as suitable branching or crosslinking agents in the preparation of polycarbonates, as the foregoing examples and the general discussion hereinbefore illustrate, the additives of this invention are much more efficacious when an already prepared polycarbonate is to be branched or crosslinked. In this regard, for example, when using azide or diazide crosslinking agents, the polycarbonate must be dissolved in a volatile organic solvent and heated for extended time periods. Since most aromatic azides decompose at temperatures of about 150° to 200° C., the polycarbonate foams and becomes discolored. Further, while azides usually give off nitrogen under processing conditions, there is nevertheless always a serious danger of an explosion. Alternatively, the use of methylene containing compounds as crosslinking agents for polycarbonates is also extremely disadvantageous inasmuch as the methylene containing compounds are usually polyamines. As is well known in the art, amines cause rapid yellowing of polycarbonates in addition to the fact that they tend to react quite readily with the carbonic acid ester grouping in the polymer. It has also been suggested that oxygen be used as a crosslinking expedient for polycarbonates. In this regard it is well known that 2,2-bis-(4-hydroxyphenyl)-propane polycarbonates, for example, when heated in the presence of air at above about 180° C., become severely yellow and lose their mechanical properties as well as their high molecular weight due to chain scission. In the foregoing cases as well as in any others which have been proposed, not only are intricate operations necessary to branch or crosslink the polymer, but additional difficult steps must be carried out in order to obtain a solvent-free polycarbonate suitable for commercial applications.

No such disadvantages are inherent in the use of the instant additive. Polycarbonates crosslinked or branched using $(PNCl_2)_3$ are color stable even at elevated temperatures for extended time periods. Further, since the instant additives are thermally stable, even at elevated temperatures, no problem is encountered due to decomposition and degradation. In addition, the additive of this invention is hydrolysis resistant and yield a branched or crosslinked polycarbonate which maintains its molecular weight even after extended time periods at elevated temperatures such as, for example, after 18 hours at 300° C. Thus, the additives of this invention represent a significant advance in the art from a commercial viewpoint.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A process for preparing branched or crosslinked polycarbonates which comprises adding to a polycarbonate an effective amount of the cyclic trimer of phosphonitrilic chloride to induce the branching or crosslinking, intimately admixing the trimer with the polycarbonate and then heating the admixture until the crosslinked or branched polycarbonate is obtained.

2. The process of claim 1 wherein from about 0.25 to about 3.5 parts by weight of the cyclic trimer is added based on the weight of the polycarbonate.

3. The process of claim 1 wherein the polycarbonate contains the repeating units

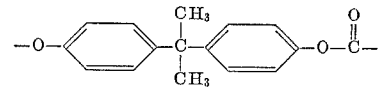

4. The process of claim 1 wherein the admixture is heated to a temperature of at least about 180° C.

5. A crosslinked polycarbonate prepared by the process of claim 1.

References Cited

UNITED STATES PATENTS

| | | | |
|---|---|---|---|
| 3,220,973 | 11/1965 | Goldberg | 260—47 |
| 3,313,774 | 4/1967 | Rice et al. | 260—47 |
| 3,525,712 | 8/1970 | Kramer | 260—47 |

SAMUEL H. BLECH, Primary Examiner

U.S. Cl. X.R.

117—161R; 260—2.5R, 9, 37PC